Nov. 22, 1927.
H. B. SMITH
1,650,050
METHOD OF MAKING PAPER STRUCTURES
Filed July 24, 1923 2 Sheets-Sheet 2
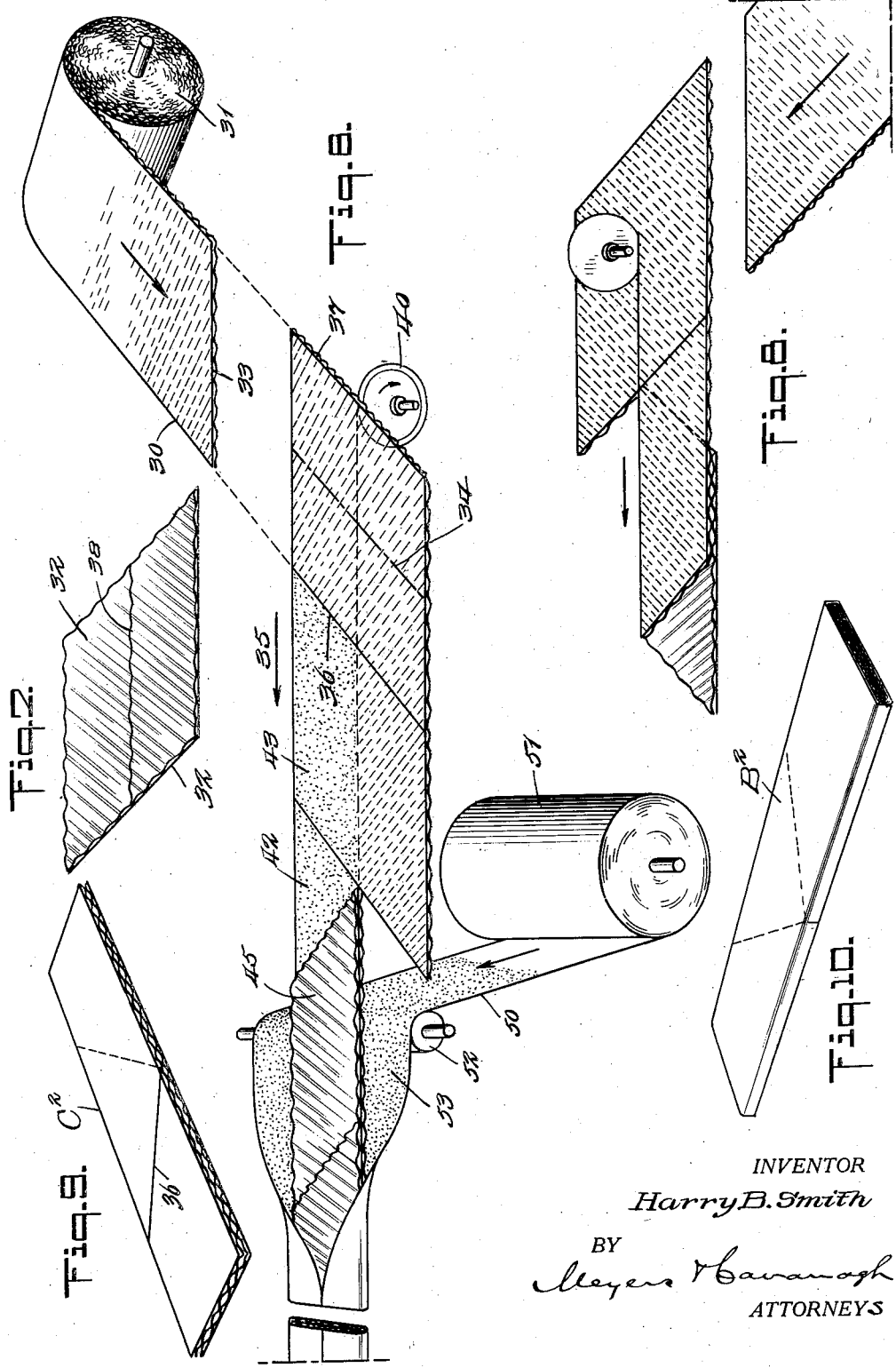
INVENTOR
Harry B. Smith
BY
Meyers & Cavanagh
ATTORNEYS Patented Nov. 22, 1927.

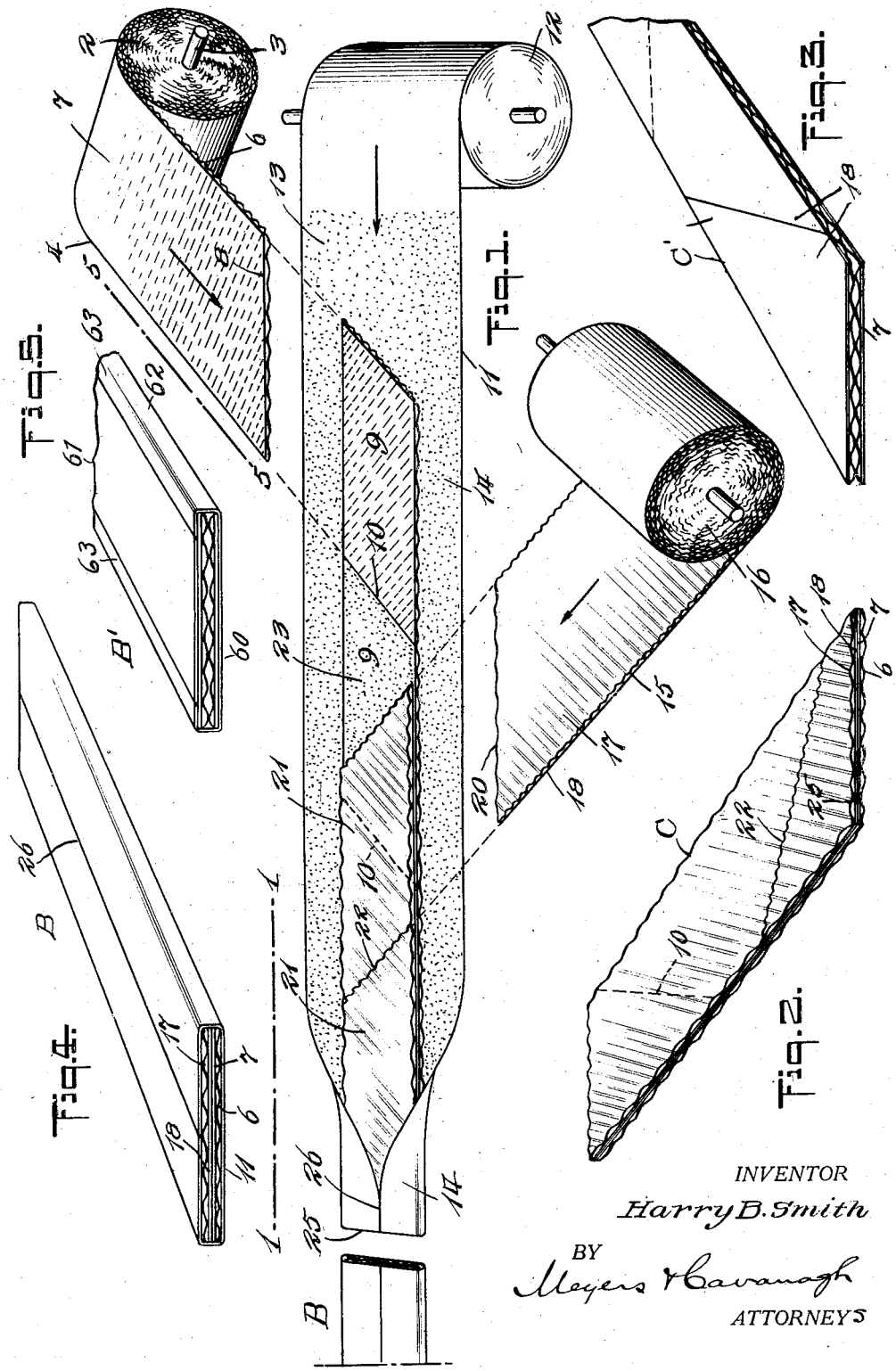

1,650,050

UNITED STATES PATENT OFFICE.

HARRY BRIDGMAN SMITH, OF BROOKLYN, NEW YORK, ASSIGNOR TO LIGHTSHIP CLOTH BOARD CORPORATION, OF BROOKLYN, NEW YORK, A CORPORATION OF NEW YORK.

METHOD OF MAKING PAPER STRUCTURES.

Application filed July 24, 1923. Serial No. 653,506.

My invention relates to methods of making paper structures such as pads, cores, cloth boards, etc., which consist in part of corrugated paper.

An important object of the invention is to provide improved methods of making paper structures of this class, in which the ribs of a corrugated sheet forming a part of the structure run diagonally in relation to a principal axis of the article, in order to provide the greatest possible stiffness in both longitudinal and transverse directions and also to provide corrugated formations at the edges of the article, which is usually of rectangular outline, with all of its edges diagonal to the corrugations and therefore intersecting a multiplicity of them.

Another important object is to provide methods of making structures in which at least two different layers of corrugated material are so arranged that their ribs run diagonally in relation to each other, and to a principal dimension of the article, thus producing a very stiff and strong corrugated structure, with edges fully supported and reenforced by the corrugated formations included in such edges, and which possesses at the same time a certain desirable amount of flexibility and resiliency.

The article may be in the form of a substantially rectangular flat "board", of moderate thickness in relation to its length and breadth, and the corrugated structures may be substantially uncovered, or in some cases only covered by facing sheets which really form a part of the webs of composite corrugated material from which the article is produced; and in such cases the articles are available for use as structural members in enclosing or protecting various commodities for shipment, as facing or covering material for various purposes where substantial thickness, strength, stiffness and other inherent qualities of the articles are desired, as floor or stair pads for use under carpets or matting, and for many other purposes; otherwise the main corrugated structure or core may be enclosed in an envelope which is usually paper of substantial thickness and strength, to suitably cover and "finish" the edges and particularly the longitudinal edges of the structure, which in this case, is especially suitable for use as a cloth board or for similar purposes.

Another important object of the invention is to provide production methods which may be broadly described as "continuous" production methods, adapted for the production of articles having the above mentioned and other desired characteristics, and in accordance with which the component materials are desirably advanced in a substantially continuous path, brought together and secured to form a continuous assembly from which the individual articles are produced by severing the assembly at suitable intervals; and the continuous method also usually includes the furnishing of the materials in continuous form, that is, usually in the form of rolls of corrugated or cover material, and advancing webs of the materials from the rolls to the point of assembly in a generally continuous fashion, although in some cases the materials may be severed to produce individual pieces before or substantially concurrently with the assembling operation.

A further object is to provide a method of advancing, severing and assembling corrugated material, especially adapted for the production of articles in which ribs of the corrugated sheets are arranged diagonally, as briefly described above.

The methods, as hereinafter particularly described, are capable of being carried out by hand operations, or with the aid of simple tools or implements, but an important feature of the invention is the provision of structures of the class described, which may be produced by machine operations, and to adapt the production methods so that, as above stated, they may be carried out by hand, and may also, when desired, be carried out by machine operations, by either entirely or partly automatic machines.

The characteristics and advantages of the invention are further sufficiently explained in connection with the following detail description of the accompanying drawings, which show certain representative embodiments of the articles to be produced, and also illustrate representative performances of the invention methods. After considering these examples, persons skilled in the art will understand that many variations may be made within the principles of the invention, and I do not limit myself to details except as claimed hereafter.

Figure 1 is a perspective view illustrating the production of a pad or core and cloth board structures by substantially continuous method.

Figure 2 is a perspective view of a pad or core structure produced by the method of Figure 1.

Figure 3 is a similar view of modified core or pad structure.

Figure 4 is a perspective view of a complete cloth board produced by the method of Fig. 1.

Figure 5 is a view of a modified form of cloth board produced by a substantially similar method.

Figure 6 is a perspective view of the modified production method.

Figure 7 is an explanatory method detail.

Figure 8 is a detail view showing a modification in the general method of Figure 6.

Figure 9 is a perspective view of a core or filler produced by the method of Fig. 6 or more particularly the modification indicated in Fig. 8.

Figure 10 is a perspective view of a cloth board produced by the method of Fig. 6.

In previous applications for United States Letters Patent, Serial No. 548,624, filed April 1, 1922, and Serial No. 548,626, filed April 1, 1922, I have disclosed cloth boards, and machines and methods for making them, in which the filler or core of corrugated material has its corrugations arranged transversely of the board. These cores are usually enclosed in an envelope. The ends of such boards are sometimes more or less defective because the filler is cut off on a line parallel with the corrugations, leaving a thin filler edge, which is not adapted to properly support the cover paper at opposite sides of the board. The board end is therefore not so strong and true as is usually desirable, and in fact is liable to be crushed down in the act of trimming or cutting off the board, and the end surface is moreover, not broad enough in all cases to properly receive a label, such as it is usually desired to place on the ends of the board. While in some structures of my invention two or more layers of corrugated material have been provided with the corrugations arranged substantially at right angles to each other, the difficulty above pointed out arises in connection with at least one layer of the corrugated material, in which the corrugations run transversely of the board.

Reference is also made to a co-pending application, Ser. No. 592,079, filed Oct. 3, 1922, which discloses a method similar to the present one in certain respects.

The present invention provides for the manufacture of pad or core structures or similar articles, and cloth boards which include corrugated board as component parts, and in which one or more layers of corrugated material may be incorporated, each of the layers being so arranged that its corrugations run diagonally in relation to the longitudinal dimension of the finished article. This may be designated as a "bias" arrangement, by analogy with bias cutting or arrangement of textiles. When the articles are cut or trimmed transversely therefore, the exposed end always includes the one or more corrugated layers which are cut in a plane diagonal to their corrugations, so that the corrugated formation of the filler layers extends right up to and is included in the end of the structure, whether covered or uncovered, and the thickness and strength of the end portions is therefore maintained and the disadvantages of previous forms of these structures, some of which are pointed out above, are avoided. The corrugated formations are also included in the longitudinal edges of the board.

While the overcoming of the stated difficulties is an important feature of the invention, it provides at the same time rapid and economical methods for producing improved cloth boards, preferably from continuous materials, that is, materials which are furnished in roll form.

Figure 1 illustrates one desirable method of producing certain forms of cores or fillers, cloth boards and similar structures, in accordance with which assembled materials are advanced in a general direction parallel to the line 1—1 and certain of the component materials are most conveniently advanced in diagonal directions. For example, a roll 2 of single-faced corrugated board is supported on a shaft 3 in such a position that a web 4 of the material drawn off from the roll advances substantially parallel to the line 5—5, that is, in diagonal relation to the general line of assembly advance 1—1. The corrugated web consists of a sheet 6 of corrugated material such as straw-board and a facing sheet 7 to which the corrugated material is adhesively attached. Since it is desirable, and necessary in most cases, for manufacturing convenience and economy, to provide the corrugated material in roll form, the ribs of the corrugated web necessarily run transversely, or parallel to the roll axis 3. Usually the composite web is rolled with the facing sheet 7 outward. In this case roll 2 is arranged so that when the combined web 4 is drawn off, the corrugated sheet 6 is downward.

The single-faced corrugated web is severed at regular intervals on the diagonal line 8, this cut usually being made at a very substantial angle to the direction of the corrugations. A 45° angle would be satisfactory in some cases; otherwise, the cutting angle may be smaller in relation to the direction of the corrugations so long as the angle is substantial and the cut crosses a plurality of the corrugations, so that these corrugated formations are included in the end structure of the completed article as later explained.

By the successive parallel cuts, a succession of individual filler pieces 9 is produced and these are arranged in a series with their ends 10, which were parts of the continuous edges of the material when in rolled form, adjacent or abutting. For the convenient advancing of the severed pieces 9 in proper relation, they may be placed directly after they are cut from the web on a continuously moving apron. In the present particular performance of the process, such a continuous carrier is represented by a web 11 of suitable envelope or cover paper, usually of substantial thickness and considerable stiffness, which is drawn from a roll 12. When the ultimate object is to produce covered cloth boards, adhesive is supplied to secure the pieces 9 to the cover web, this being sufficiently indicated by stippling 13 to indicate the applications of adhesive to the entire upper surface of the cover sheet prior to the placing of the filler pieces 9 upon it. Projecting margins 14 of the cover strip may now be folded over on the single layer of filler material, consisting of pieces 9, but preferably in many cases, the filler consists of a plurality of layers of corrugated material and therefore, in the present example, another strip or web 15 of single face corrugated material is advanced diagonally from a suitably arranged roll 16. In this case the corrugated layer 17 of the web is arranged upward and the flat facing strip 18 is downward. The web 15 is severed at regular intervals on the line 20 parallel to the line 1 of assembly advance, producing a succession of individual filler pieces 21 which are arranged in line with their ends 22, similar to ends 10 of filler pieces 9, adjacent or abutting and superposed upon the pieces 9. Adhesive is supplied to secure the upper and lower filler pieces together, this being sufficiently indicated by stippling 23 indicating that adhesive is applied to the upper or facing sheets of pieces 9 before pieces 21 are applied. Desirably, the pieces 21 are cut from web 15 and applied to the pieces 9 in such a way that the joints, indicated by the lines 10 and 22, are in staggered relation, that is, they are not superposed upon each other, but are intermediately arranged as sufficiently indicated by full and dotted lines in Figure 1. The filler pieces 9 and 21 are properly pressed in position as the assembly advances.

It will now be evident that when two or more layers of filler pieces are provided, in cases where it is not desired to enclose the filler pieces in a cover or envelope, the web 11 of envelope material may be omitted or may represent merely a carrier for the composite filler, which in that case will not be adhesively secured to the apron; and the continuous composite filler is substantially completed by the application of adhesive 23 and the positioning and pressing of the pieces 21 in engagement with pieces 9. The continuous pad or filler structure without the envelope sheet may then be advanced to any convenient point and cut off on transverse lines 25 at regular intervals, producing completed pad, core, or filler pieces C, Figure 2. Otherwise when the object of the operations is to produce a covered cloth board, the filler members are associated with the cover web 11 and with each other in the manner described, and after the pieces 21 are positioned the assembly is advanced and at a suitable point the projecting margins 14 of the cover web are turned over and pressed upon the upper surface of the filler pieces 21, with a lap joint consisting of overlapped longitudinal margins of the cover web, or preferably, as in the present case, the cover web edges 26 are brought closely together with a "butt" joint. The continuous assembly is then severed on the lines 25 producing complete individual cloth boards B, Figures 1 and 4, each of which consists of a core or filler structure C of Figure 2, enclosed in an envelope of cover material 11.

It will now be evident that since the corrugations of the one or more filler layers are arranged at a substantial angle to the longitudinal dimensions of the continuous assembly or of the individual boards or filler pieces, when the core or cloth board assembly is cut on transverse lines, at right angles to the longitudinal dimension, the cutting plane intersects a large plurality of the corrugations and the corrugated formation of the filler pieces is therefore included in the end structure of the core or cloth board, Figure 2 or 4, and the end structure is therefore properly spaced, reinforced and supported by the corrugated formation; and in the case of a covered cloth board, the cover surfaces are properly spaced and supported to provide board ends of proper width for the reception of the usually desired label.

The board is not subject to ready crushing down at the ends, as in the case of boards in which the filler corrugations run at right angles to the longitudinal dimension, that is, parallel to the ends of the board, and which in that case are severed in planes which do not intersect a plurality of the corrugations, but run parallel with them and therefore produce a core end formation which consists only of a single layer of paper, which has no appreciable supporting effect for the end of the board.

Preferably the cuts 25 to sever the individual cores or boards are made in such positions that they do not intersect the joints 10 or 22, although in some cases it is immaterial where the severing cuts are made, since the joints or lines of abutment of the individual core pieces do not materially weaken the structure, all parts of which are securely held together by adhesive.

In the case of either the pad or filler pieces C, Figure 2 or the cloth board Figure 4, when constructed as described, the corrugated layers 6 and 17 are outward and the facing sheets 7 and 18 are in facial contact between the corrugated layers. This is satisfactory and desirable in many cases, but otherwise it may be desired to have the corrugated sheets or layers inward and in contact with each other and the facing sheets outward, as illustrated in the core or pad C¹, Figure 3, and the cloth board B¹, Figure 5. To produce this result it is only necessary to reverse the positions of the rolls 2 and 16 so that the corrugated layer 6 of web 4 will be upward and the corrugated layer 17 of web 15 will be downward. Adhesive is supplied in substantially the same way, as shown in Figure 1, but in that case the crossed corrugations will be properly coated with adhesive and will be secured together at every point of contact of the diagonally arranged corrugations of the respective filler pieces. There is thus formed in the interior of the pad or cloth board a very light and strong cellular structure, practically integrally united by adhesive at a multiplicity of intersecting points. This arrangement is especially desirable in the case of pads or filler pieces as shown in Figure 3, which may be used for a variety of purposes, such as carpet or stair pads, boxing material, etc., since the outwardly located facing sheets 7 and 18 both reenforce and hold the corrugated material in proper form, and protect it from mechanical injury.

Figures 6 and 7 show a modification of the method, which provides for forming a multiple layer corrugated pad, core piece, or cloth board, from a single web of corrugated material. A single-faced corrugated web 30 is drawn from a roll 31 and advanced in diagonal relation to the general arrangement of the assembly, and suitable pieces 32 are produced by cutting the web at regular intervals on diagonal lines 33, the severed pieces being substantially twice as long as in the previous instance, or double the width of the completed core structure in the direction of movement of the web 30, that is, in the dimension 34, Figure 6. The pieces are then moved substantially in the direction of the arrow 35 with their edges 36 in contact or closely adjacent, and one layer or face of the composite web, such, for instance, as the corrugated sheet 37, is slit along the line 38 by any suitable device such as a rotary slitter 40. Figure 7 is a bottom view of the advancing pieces 32 to clearly show the line of incision 38. This cutting of the corrugations is to permit the ready folding of the double-width core pieces along the line 38, and this folding is performed at a suitable point in the advance of the assembly, whereupon each of the pieces 32 is doubled, in this case with the facing layers brought into facial contact and with the corrugated layers outward. This method of folding leaves a triangular portion 42 of single thickness at each end of each piece 32, that is to say, the triangular piece at each end consists of a single facing sheet and its corresponding corrugated piece, and the folding over of the successive pieces causes the foremost triangular portion of one piece to be registered upon the rearmost triangular portion of the piece ahead of it. Adhesive, sufficiently indicated by stippling 43, is applied, to secure the folded over portions of the corrugated filler pieces together and to secure the overlapped triangular portions of adjacent pieces to each other. Adhesive may be spread only on one longitudinal portion of the pieces 32 or all the way across. When it is desired only to produce pads or filler pieces without an envelope or cover, the successive sheets 32 may be held in proper relation and advanced by any suitable means until they are folded over and adjacent pieces are secured to each other in the manner indicated. For instance, the pieces may be laid on a traveling belt or apron and advanced until the continuous assembly is completed, until the triangular end portions are overlapped and the assembly may then be severed at regular intervals by transverse cuts through the assembly at about the point indicated by reference numeral 45, producing individual cores or fillers, pads or packing pieces, substantially like those illustrated in Figure 2, with the exception that along one longitudinal edge of the pad the facing sheets are connected along their fold line 38.

A variation of this method is sufficiently illustrated in Figure 8, in accordance with which the longitudinal slitting is performed on the facing sheet and the corrugated pieces are then folded over with the corrugations inward and the facing sheets outward, to produce completed pads or fillers C², Figure 9, which are similar to those of Figure 3, except that the intersecting lines 36 of the separate filler pieces come together or meet in superposed relation at one side of the pad.

When it is desired to produce a cloth board by this general modification of the method, a cover web 50 is drawn from a roll 51 of suitable cover material and is applied to the core assembly at any convenient point. The core assembly may be formed upon the cover web 50, or the cover web may be applied to one face of the core assembly at a point 52 where the cover web is led over a roll and the core assembly pressed upon it, adhesive 53 being applied to a face of the cover web or to both faces of the core assembly. The projecting margins of the cover web are then turned over and secured and individual cloth boards B², Figure 10 are produced by severing the assembly transversely at regular intervals.

The production methods as so far described are performed by hand operations, or with the aid of a few tools or appliances of elementary simplicity. The core pad and cloth board structures are, however, so designed that they may be produced rapidly and economically by suitable automatic or partly automatic machinery.

The term "continuous," as applied to methods of handling the materials is used in its broader sense to indicate the advance of the materials in continuous webs from rolls and the subsequent movements of the materials, whether severed into individual pieces or not, through a predetermined course without any substantial interruption or delay, to produce a continuous assembly of core material or a continuous covered assembly, such as a cloth board assembly, from which individual pads, cores or cloth board members are severed to produce the finished articles, or the term "continuous" as here used may designate merely a substantially uniform and uninterrupted supply and manipulation of the component material to produce the designated articles with great rapidity and economy.

With any of the different filler structures, that is, a filler including one or more corrugated layers produced in any of the different ways described, the filler structure may be covered with a single cover sheet to produce a covered cloth-board, as illustrated in Figure 4 or otherwise the cover or envelope may be in two sheets 60 and 61, Figure 5 and these sheets may be advanced from rolls and suitably folded and applied to the core structure and cut off. For instance, sheet 60 may be handled substantially as the continuous cover web 13 is handled in the method illustrated in Figure 1 with the exception that the sheet 60 is not wide enough to cover both faces of the board, but it is arranged to cover one flat face and the edges 62 and marginal portions 63 of sheet 60 are turned over and secured to margins of the opposite face of the board. A second cover strip or sheet 61 of a width sufficient to closely fit between the edges of the margin 63 is advanced and adhesively supplied to produce the cover structure shown in Figure 5. Other variations may be made in detail of the cover or envelope structure and the method of applying it.

The methods of applying adhesive to secure different parts of the structure together may also be varied considerably, some of these variations having been mentioned above. In addition to the preceding statements, it is sufficient to mention the following variations: Instead of applying adhesive to the cover web, as shown in Figure 1, adhesive may be applied to both faces of the core or filler material when a single layer of corrugated material is used or when there is a double layer consisting of pieces 9 and pieces 21, adhesive may be applied to the upper surface of the layer consisting of pieces 21 before or after these pieces are applied to the layer consisting of pieces 9. When the core or filler structure is built up from a single web of material, as described in connection with Figure 8, adhesive may be applied to both faces of the pieces 32 or to portions of one face and all over the other face of these pieces, depending on the direction in which the pieces are folded over along the lines 38. For example, one face may be coated over the zone 43 substantially one-half of the width of the pieces in their direction of advance as indicated by the arrow 35, and this provides for the securing of the other half of the piece when folded over and also for the securing of each successive piece to the one ahead of it; and the other face of the pieces may be coated all over to provide adhesive for securing the cover web 50 to both faces of the filler. In that case application of adhesive to the cover web, as indicated in Figure 6, may be omitted. Other variations in the mode of adhesive application will be evident without further explanation.

I claim:

1. A method of making a composite structure consisting mainly of cardboard or similar sheet material, comprising advancing a continuous sheet of material, advancing other sheet material in a generally lateral direction with reference to the sheet first mentioned and applying said other sheet material to the first sheet to form a multi-ply structure.

2. A method of making a composite structure consisting mainly of cardboard or similar sheet material, comprising advancing a continuous sheet of material, advancing other sheet material in a generally lateral direction with reference to the sheet first mentioned, applying said other sheet material to the first sheet to form a multi-ply structure, and folding laterally projecting portions of the first named sheet to complete the enclosure of a core structure including said other sheet material.

3. A method of making a composite structure consisting mainly of cardboard or similar sheet material, comprising advancing a continuous sheet of material, advancing other sheet material in a generally lateral direction with reference to the sheet first mentioned, applying said other sheet material to the first sheet to form a multi-ply structure, and severing the combined materials laterally to produce individual multi-ply articles.

4. A method of making a composite structure consisting mainly of cardboard or similar sheet material, comprising advancing a continuous sheet of material, advancing other sheet material in a generally lateral direction with reference to the sheet first mentioned, applying said other sheet material to the first sheet to form a multi-ply structure, folding laterally projecting portions of the first named sheet to complete the enclosure of a core structure including said other sheet material, and severing the combined materials laterally to produce individual multi-ply articles.

5. A method of producing paper structures of the class described, comprising advancing a strip of corrugated sheet material in which the corrugations are arranged transversely of the longitudinal axis of the strip, severing the strip at regular intervals on a line diagonal to the corrugations, and arranging and securing successive severed pieces with their edges closely adjacent to form a continuous assembly of corrugated sheet material having straight longitudinal edges and corrugations arranged diagonally to said edges and the longitudinal axis of the assembly.

6. A method of producing paper structures of the class described, comprising advancing a strip of corrugated sheet material in which the corrugations are arranged transversely of the longitudinal axis of the strip, severing the strip at regular intervals on a line diagonal to the corrugations, and arranging and securing successive severed pieces with their edges closely adjacent to form a continuous assembly of corrugated sheet material having straight longitudinal edges and corrugations arranged diagonally to said edges and the longitudinal axis of the assembly, and severing the assembly at regular intervals on a line transverse its longitudinal axis to produce individual articles.

7. A method of producing paper structures of the class described, comprising advancing from a roll a continuous strip of single faced corrugated sheet material in which the corrugations run at right angles to the length of the strip, severing the strip at regular intervals on a line diagonal to the corrugations, arranging successive severed pieces with edges which constituted longitudinal edges of the continuous strip closely adjacent to each other to produce a continuous assembly, and placing a second layer of corrugated sheet material in flatwise relation to the first layer and adhesively securing it thereto with its corrugations arranged diagonal to those of the first layer and to the longitudinal axis of the assembly.

8. A method of producing paper structures of the class described, comprising advancing from a roll a continuous strip of single faced corrugated sheet material in which the corrugations run at right angles to the length of the strip, severing the strip at regular intervals on a line diagonal to the corrugations, arranging successive severed pieces with edges which constituted longitudinal edges of the continuous strip closely adjacent to each other to produce a continuous assembly, and placing a second layer of corrugated sheet material in flatwise relation to the first layer and adhesively securing it thereto with its corrugations arranged diagonal to those of the first layer and to the longitudinal axis of the assembly, and severing the continuous assembly at regular intervals on a line at a right angle to its longitudinal axis.

9. A method of producing cloth boards and similar articles, comprising advancing a continuous strip of fibrous sheet cover material of substantial thickness and stiffness, advancing and arranging successive individual pieces of sheet material to produce a continuous core assembly including a layer of corrugated sheet material, the ribs of which are arranged diagonally to the longitudinal assembly axis, advancing the core assembly in general parallelism to the cover strip, and folding and adhesively securing the cover strip about the core assembly to cover its faces and longitudinal edges.

10. A method of producing cloth boards and similar articles, comprising advancing a continuous strip of fibrous sheet cover material of substantial thickness and stiffness, advancing and arranging successive individual pieces of sheet material to produce a continuous core assembly including a layer of corrugated sheet material, the ribs of which are arranged diagonally to the longitudinal axis, advancing the core assembly in general parallelism to the cover strip, folding and adhesively securing the cover strip about the core assembly to cover its faces and longitudinal edges, and severing the combined core and cover assembly at regular intervals on transverse lines to produce individual cloth boards, the ends of which include a multiplicity of the corrugated formations of the core structure.

11. A method of producing cloth boards and similar articles, comprising advancing a continuous strip of fibrous sheet cover material of substantial thickness and stiffness, advancing a strip of corrugated sheet filler material in a direction generally diagonal to the movement of the cover strip, the corrugations of the corrugated strip being arranged at right angles to the longitudinal axis thereof, severing the corrugated strip at regular intervals on lines diagonal to the corrugations and substantially parallel to the axis of the cover strip, securing the successive filler pieces adhesively to the cover strip along a central zone thereof and with their ends, which constituted a longitudinal edges of the continuous corrugated strip, closely adjacent and diagonal to the longitudinal axis of the cover strip, the core corrugations being thus arranged diagonally to said longitudinal cover strip axis, and folding over side margins of the cover strip and securing them upon a face of the corrugated pieces to complete the covering of the faces and longitudinal edges of the core structure.

12. A method of producing cloth boards and similar articles, comprising advancing a continuous strip of fibrous sheet cover material of substantial thickness and stiffness, advancing a strip of corrugated sheet filler material in a direction generally diagonal to the movement of the cover strip, the corrugations of the corrugated strip being arranged at right angles to the longitudinal axis thereof, severing the corrugated strip at regular intervals on lines diagonal to the corrugations and substantially parallel to the axis of the cover strip, securing the successive filler pieces adhesively to the cover strip along a central zone thereof and with their ends, which constituted longitudinal edges of the continuous corrugated strip, closely adjacent and diagonal to the longitudinal axis of the cover strip, the core corrugations being thus arranged diagonally to said longitudinal cover strip axis, and folding over side margins of the cover strip and securing them upon a face of the corrugated pieces to complete the covering of the faces and longitudinal edges of the core structure, and severing the continuous assembly so produced on transverse lines at regular intervals to produce individual cloth boards.

13. A method of making a composite structure consisting mainly of cardboard or similar sheet material, comprising advancing a continuous sheet, advancing other sheet material in a generally lateral direction with reference to the first named sheet and applying successive distinct pieces of such other material having edges which are then located substantially transverse the continuous sheet with said edges substantially abutting to form a continuous composite assembly.

14. A method of making a composite structure consisting mainly of cardboard or similar sheet material, comprising advancing a continuous sheet, advancing other sheet material in a generally lateral direction with reference to the first named sheet, applying successive distinct pieces of such other material having edges which are then located substantially transverse the continuous sheet with said edges substantially abutting to form a continuous composite assembly, and folding and securing laterally projecting portions of the first named sheet to enclose the core structure including said other sheet material.

15. A method of making a composite structure consisting mainly of cardboard or similar sheet material, comprising advancing a continuous sheet, advancing other sheet material in a generally lateral direction with reference to the first named sheet, dividing such other material into separate pieces, and applying and securing said pieces successively to the first named sheet with their edges substantially abutting to form a continuous composite assembly.

16. A method of making a composite structure consisting mainly of carboard or similar sheet material, comprising advancing a continuous sheet, advancing other sheet material in a generally lateral direction with reference to the first named sheet, dividing said other material into separate pieces, applying and securing said pieces successively to the continuous sheet with their edges substantially abutting to form a continuous composite assembly, and folding and securing laterally projecting portions of the first named sheet to enclose the core structure including said other sheet material.

17. A method of making a composite structure consisting mainly of cardboard or similar sheet material, comprising advancing a continuous sheet, advancing other sheets in generally diagonal directions with relation to the first sheet, and applying said other sheets to the first to form a core structure.

18. A method of making a composite structure consisting mainly of carboard or similar sheet material, comprising advancing a continuous sheet, advancing other sheets in generally diagonal directions with relation to the first sheet, applying said other sheets to the first to form a core structure, and folding lateral projecting parts of the first named sheet to complete the enclosure of the core structure.

19. A method of making a composite structure consisting mainly of cardboard or similar sheet material, comprising advancing a continuous sheet, advancing other sheet material in generally lateral directions with relation to the first sheet and applying said other sheet material in superposed layers to form a composite core structure.

20. A method of making a composite structure consisting mainly of cardboard or similar sheet material, comprising advancing a continuous sheet, advancing other sheet material in generally lateral directions with relation to the first sheet, applying said other sheet material in superposed layers to form a composite core structure, and folding and securing laterally projecting portions of the first sheet to complete the enclosure of the core.

21. A method of making a composite structure consisting mainly of cardboard or similar sheet material, comprising advancing a continuous sheet, advancing other continuous sheet material in a generally lateral direction, severing pieces of said laterally advanced sheet and applying the severed pieces to the first named sheet with edges closely abutting to form a substantially continuous core structure.

22. A method of making a composite structure consisting mainly of cardboard or similar sheet material, comprising advancing a continuous sheet, advancing other continuous sheet material in a generally lateral direction, severing pieces of said laterally advanced sheet, applying the severed pieces to the first named sheet with edges closely abutting to form a substantially continuous core structure, and folding and securing laterally projecting parts of the first sheet to complete enclosure of the core.

23. A method of producing composite fibrous structures, comprising advancing a continuous sheet of cardboard or analogous material, advancing another continuous sheet of similar material in a generally lateral direction, severing successive pieces of the laterally advanced material, and applying severed pieces to the continuous sheet first named to produce a continuous multi-ply structure.

24. A method of producing composite fibrous structures, comprising advancing a continuous sheet of cardboard or similar material, advancing other continuous sheets in opposite directions transverse that of the first named sheet, severing successive portions of said transversely advanced sheets, and applying the severed portions to the first named sheet to form a continuous multi-ply assembly.

25. A method of producing composite fibrous structures, comprising advancing a continuous sheet of cardboard or similar material, advancing other continuous sheets in opposite directions transverse that of the first named sheet, severing successive portions of said transversely advanced sheets, applying the severed portions to the first named sheet to form a continuous multi-ply assembly, and folding and securing laterally projecting portions of the first named sheet to complete enclosure of the core structure formed by the applied pieces.

Signed at Brooklyn, in the county of Kings and State of New York this 20th day of July A. D. 1923.

HARRY BRIDGMAN SMITH.